March 23, 1971  A. BAK  3,572,119
FLUID QUANTITY INDICATING DEVICE
Filed Aug. 7, 1969
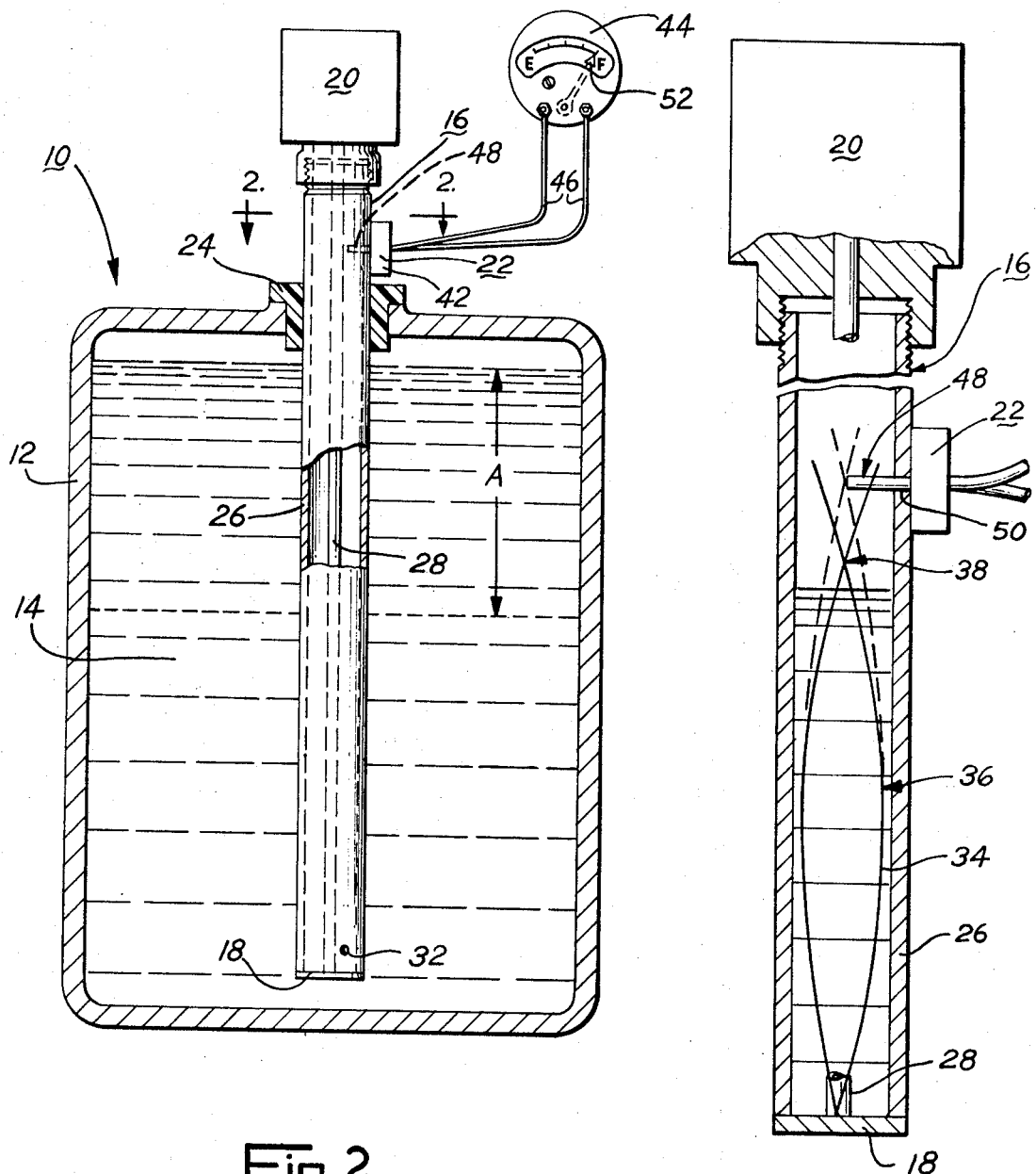
INVENTOR.
ALOYSIUS BAK
BY
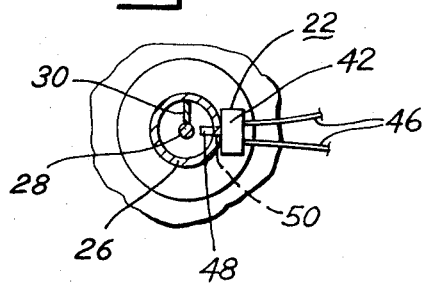
ATTORNEY ись
United States Patent Office 3,572,119
Patented Mar. 23, 1971

3,572,119
FLUID QUANTITY INDICATING DEVICE
Aloysius Bak, Davenport, Iowa, assignor to
The Bendix Corporation
Filed Aug. 7, 1969, Ser. No. 848,290
Int. Cl. G01f 23/28
U.S. Cl. 73—290    6 Claims

ABSTRACT OF THE DISCLOSURE

A device for indicating the quantity of fluid in a vessel. A waveguide that is connected to a source of microwave energy is extended in the fluid with the fluid being present in the waveguide at a level equal to the fluid level in the vessel. A node is created at the lower end of the waveguide by a shorting bar. A detector that is responsive to mircowave energy is connected to the waveguide to detect changes in another mode location within the waveguide due to changes in fluid level in the vessel and waveguide.

SUMMARY OF THE INVENTION

It is an object of this invention to provide an improved fluid quantity indicating device.

Another object of this invention is to provide a fluid quantity indicating device having improved sensitivity and accuracy.

A further object of this invention is to provide a fluid quantity indicating device employing microwave techniques.

More specifically, it is an object of this invention to provide a fluid quantity indicating device having waveguide means, one end of which is immersed in said fluid and the other end of which is connected to a source of microwave energy, said device including detector means connected to said waveguide means above the surface of said fluid.

Other objects and features of the invention will be apparent from the following description of the fluid quantity indicating device taken in connection with the accompanying drawing.

BRIEF DESCRIPTION OF THE DRAWING

FIG. 1 is a side view, partially in section, depicting the fluid quantity indicating device of this invention;

FIG. 2 is a sectional view taken along line 2—2 of FIG. 1; and

FIG. 3 is an enlarged view, partially in section, taken along the longitudinal axis of the waveguide means to pictorially show the electrical operation of the device.

DESCRIPTION OF THE PREFERRED EMBODIMENT

Referring to the drawing, and particularly FIG. 1, a fluid quantity indicating device is generally identified by the numeral 10. The fluid or liquid level indicating device 10 is comprised of a vessel 12 containing a fluid 14, waveguide means 16, shorting means 18, a source of microwave energy 20, and detector means 22.

Although the vessel 12 is shown as a generally cylindrically shaped closed container, other shapes or configurations may, of course, be used. As will be understood by those skilled in the art, the fluid 14 may be of any type as long as it is not flammable or combustible when exposed to the source of microwave energy 20. It is further necessary that this device 10 be used for fluids having a dielectric constant or loss tangent different from the dielectric constant or loss tangent of the medium above the surface of the fluid. It is also noted that the detector means 22 must be positioned between the surface of the fluid 14 and the source of microwave energy 20. The source of microwave energy 20 may be selected for any particular application and could, of course, be varied from application to application. More specifically, the source of microwave energy 20 could be comprised of electromagnetic radiation of wavelengths from submillimeter through those greater than 30,000 meters.

The waveguide means 16 is comprised of a plug or guide member 24 which carries and vertically positions an outer element 26 of the waveguide means 16. As shown best in FIG. 2, the outer element 26 carries an inner element 28 via a dielectric support 30. As may now be seen by those skilled in the art, the outer element 26 and the inner element 28 are concentrically positioned by the dielectric support 30 to form a coaxial waveguide of the waveguide means 16. The shorting means 18, being of a generally disc shape, is attached to the end of the coaxial waveguide which is immersed in the fluid 14. The shorting disc or means 18 is structurally and electrically connected to both the outer element 26 and the inner element 28 to provide a high frequency short therebetween. The outer element 26 is also provided with an opening 32 of predetermined size to allow communication of the fluid 14 into the interior of the coaxial waveguides 16; i.e., into the space between the inner and outer elements 28 and 26, respectively.

The other end of the waveguide means 16 has mounted thereto the source of microwave energy 20. The source of microwave energy is positioned so as to emit electromagnetic radiation into the coaxial waveguide 16. The microwave energy will travel down the coaxial waveguide 16 through the medium above the surface of the fluid 14 (for example air), past the detector means 22, and into and through the fluid 14 until it reaches the shoring means 18 where further travel is precluded by the high frequency short between the inner and outer conductors 28 and 26, respectively. As understood by those skilled in the art, the emission of microwave energy into the coaxial waveguide 16 will provide a standing wave 34 which is shown in graphical form in FIG. 3. The standing wave 34 may be shown as having voltage amplitude maximums 36 and minimums or nodes 38 along progressive positions of the coaxial waveguide 16. It is also noted that one of the nodes exists at the location of the shorting means 18 at all fluid levels.

The detector means 22 is comprised of an electric field intensity sensitive element 42 and an indicating element 44 electrically connected by conductors 46 to the field intensity sensitive element 42. The electric field intensity sensitive element 42 includes a probe 48 and is mounted to the outer element 26 of the coaxial waveguide 16 such that the probe 48 projects through an opening 50 into the interior of the waveguide 16, as may best be seen in FIG. 2. As clearly seen in FIG. 1, the electric field intensity sensitive element 42, including its probe 48, is mounted above the maximum possible fluid level and below the source of microwave energy 20. It is important to note that the probe 48 must be mounted such that for an empty vessel, one node 38 of the standing wave 34 appears at the exact position of the probe 48, as shown in FIG. 3, for reasons to be more fully explained hereinafter.

Regarding the mode of operation of the fluid level indicating device 10, assume that the vessel 12 is filled with fluid 14 as shown in FIG. 1, and that the source of microwave energy 20 is energized and is thus emitting microwave energy. One of the maximum 36 of the standing wave 34 will be located substantially adjacent the probe 48 so that the pointer 52 of the indicating element 44 is deflected to align with the letter F (which indicates that the vessel is full). As fluid 14 is removed from the vessel 12 through means of an outlet (not shown), the distance between the source of microwave energy 20 and the surface of the fluid 14 becomes greater, thereby changing the load impedance of the coaxial waveguide 16 into which the microwave energy is emitted. (As shown in FIG. 1 the lower fluid level is indicated by a dotted line and the change in distance is indicated by the letter A.) When the load impedance changes, the node 38 of the standing wave 34 shifts upward, as shown by the dotted curves in FIG. 3. This shift of the node causes the probe 48 and the electric field intensity sensitive element 42 to see a decreased electric field intensity, which causes the indicating element to rotate or move pointer 50 to the left to indicate a lower fluid level. As will be further understood by those skilled in the art, the selection of the indicating element 44, the electric field intensity sensitive element 42, the waveguide means 16, and the source of microwave energy 20 is such that the pointer 50 aligns itself with the E of the indicating element 44 when all or nearly all of the fluid 14 is removed from the vessel 12.

While specific details have been herein shown and described, the invention is not confined thereto, as other substitutions can be made within the spirit and scope of the invention.

What is claimed is:

1. A system for measuring the quantity of fluid within a container comprising:

a vessel containing a fluid;
   waveguide means located within said vessel and having one end thereof immersed in and containing said fluid;
   shorting means operatively connected to said one end of said waveguide means;
   a source of microwave energy affixed to the other end of said waveguide means for producing a standing wave throughout the length of said waveguide with a node being produced by said shorting means; and
   detector means projecting interiorly of said waveguide means intermediate said source of microwave energy and said fluid;
   said detector means being responsive to variations in said standing wave produced by said source of microwave energy to indicate the quantity of said fluid within said vessel, said standing wave variations being a function of the level of said fluid.

2. A liquid level indicating system comprising:

a vessel containing a liquid;
   waveguide means located within said vessel and having one end thereof immersed in and containing said liquid;
   shorting means operatively connected to said one end of said waveguide means;
   a source of microwave energy affixed to the other end of said waveguide means for emitting microwave energy into said waveguide means and forming a standing wave throughout the length of said waveguide, said standing wave having a first node at said shorting means and a second node which shifts with changes in liquid level; and
   detector means projecting interiorly of said waveguide means intermediate said source of microwave energy and said liquid near said second node;
   said detector means being responsive to said standing wave when said second node shifts to thereby indicate the level of said liquid within said vessel.

3. A liquid level indicating system, as recited in claim 2, wherein said waveguide means comprises a coaxial waveguide.

4. A liquid level indicating system, as recited in claim 3, wherein said shorting means is a disc shaped conductive element for shorting said one end of said coaxial waveguide.

5. A liquid level indicating system, as recited in claim 2, wherein said waveguide means includes an opening of predetermined size to allow communication of said liquid to the interior of said waveguide means.

6. A liquid level indicating system, as recited in claim 2, wherein said detector means comprises an electric field intensity sensitive element and an indicating element electrically connected and responsive thereto.

References Cited

UNITED STATES PATENTS

| 3,398,578 | 8/1968 | Dozer | 73—304 |
| 3,474,337 | 10/1969 | Petrick | 73—290 |

FOREIGN PATENTS

| 201,307 | 6/1958 | Austria | 73—304 |

LOUIS R. PRINCE, Primary Examiner

D. E. CORR, Assistant Examiner

U.S. Cl. X.R.

324—58.5